(12) United States Patent
Kreuzer et al.

(10) Patent No.: US 7,600,311 B2
(45) Date of Patent: Oct. 13, 2009

(54) METHOD FOR PRODUCING A MAGNETICALLY EXCITABLE CORE COMPRISING A CORE WINDING FOR AN ELECTRIC MACHINE

(75) Inventors: Helmut Kreuzer, Schwieberdingen (DE); Eberhard Rau, Korntal-Muenchingen (DE); Adam Willmott, Swansen (GB); Alan Fussey, More by Sea (GB); Williams Neil, Bridgend (GB); Martin Henne, Moeglingen (DE); Klaus Pflueger, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 09/937,167

(22) PCT Filed: Jan. 22, 2001

(86) PCT No.: PCT/DE01/00244

§ 371 (c)(1),
(2), (4) Date: Jan. 8, 2002

(87) PCT Pub. No.: WO01/54254

PCT Pub. Date: Jul. 26, 2001

(65) Prior Publication Data

US 2003/0071534 A1    Apr. 17, 2003

(30) Foreign Application Priority Data

Jan. 20, 2000   (DE) ............................... 100 02 385

(51) Int. Cl.
*H01F 7/06* (2006.01)
(52) U.S. Cl. ............................ 29/606; 29/596; 29/605; 29/609; 310/90; 310/179; 310/184; 310/198; 310/208

(58) Field of Classification Search ................ 29/592.1, 29/596, 598, 605, 606, 609, 736, 751, 753; 140/92.1; 100/214; 310/90, 179, 184, 198, 310/208, 258, 259
See application file for complete search history.

(56) References Cited

U.S. PATENT DOCUMENTS 1,756,672 A    4/1930    Barr (Continued)

FOREIGN PATENT DOCUMENTS

| DE | 1 002 385 | 2/1957 |
| DE | 34 08 394 A1 | 9/1985 |

(Continued)

OTHER PUBLICATIONS

"Toroidal stator winding through computer controlled equipment"; Mirza, N.I.; Electrical Electronics Insulation Conference, 1995 and Electrical Manufacturing & Coil Winding Conference. Proceedings, Sept. 18-21, 1995; pp. 525-527.*

(Continued)

*Primary Examiner*—Paul D Kim
(74) *Attorney, Agent, or Firm*—Michael J. Striker (57) ABSTRACT

A method for producing a magnetically excitable core for an electrical machine, by which in a method step (S1), the core, having a substantially parallelepiped shape with slots extending parallel on one side, is furnished, into whose slots, in a method step (S2), the core winding is inserted by its winding sides, and then in a method step (S3), the core together with the core winding is reshaped into a cylindrical ring shape with radially inward-oriented slots, is proposed. The method is characterized by a further step, according to which in each case all winding sides that are inserted into each slot are pressed into a slot shape in a tool and reshaped before being inserted into the slot.

12 Claims, 11 Drawing Sheets

U.S. PATENT DOCUMENTS

| | | | |
|---|---|---|---|
| 2,607,816 A | 8/1952 | Ryder et al. | |
| 4,102,040 A | 7/1978 | Rich | 29/598 |
| 4,543,708 A | 10/1985 | Matsubara et al. | 29/598 |
| 4,571,822 A | 2/1986 | Saito | 29/736 |
| 5,212,419 A * | 5/1993 | Fisher et al. | 310/254 |
| 5,592,731 A * | 1/1997 | Huang et al. | 29/596 |
| 5,787,567 A | 8/1998 | Miyazaki | 29/596 |
| 5,946,796 A * | 9/1999 | Burch | 29/736 |
| 6,218,758 B1 * | 4/2001 | Miura et al. | 310/254 |
| 6,317,962 B1 | 11/2001 | Adachi et al. | 29/596 |

FOREIGN PATENT DOCUMENTS

| | | |
|---|---|---|
| DE | 38 03 752 A | 8/1988 |
| EP | 0 652 622 A2 | 5/1995 |
| JP | 56094939 A | 7/1981 |
| JP | 01252141 A | 10/1989 |
| JP | 04100968 A * | 4/1992 |
| JP | 7-222408 | 8/1995 |
| WO | 98 48500 A | 10/1998 |

OTHER PUBLICATIONS

Patent Abstracts of Japan, vol. 12, No. 425 (E-681), Nov. 10, 1988 & JP 63 161 845 A, Jul. 5, 1988.

Patent Abstracts of Japan vol. 1997, No. 8, Aug. 29, 1997 & JP 09 103052 A, Apr. 15, 1997.

Patent Abstracts of Japan vol. 199, No. 4, Apr. 30, 1999 & JP 11 018378 A, Jan. 22, 1999.

* cited by examiner

METHOD FOR PRODUCING A MAGNETICALLY EXCITABLE CORE COMPRISING A CORE WINDING FOR AN ELECTRIC MACHINE

BACKGROUND OF THE INVENTION

From Japanese Published, Nonexamined Patent Application 9-103052, a production method for the stator of an electrical machine.

For producing this stator, first individual laminations are stamped out, and a certain number of these laminations are stacked, covering one another, until the desired axial width of the core is reached. These stacked laminations form the stator core, which thus on one side has typical teeth and slots, oriented parallel to one another, for a stator. An already pre-wound core winding, embodied as a distributed wave winding, is in approximately flat form and is then inserted into the slots of the substantially flat core. The flat component unit comprising the core and the core winding has a so-called winding overhang; that is, each individual one of a total of three phases has a winding side which initially is not inserted into slots. This component unit comprising the core and the core winding is then bent round in such a way that a typical hollow-cylindrical stator is created. The overhanging winding sides must finally be inserted into the corresponding slots before the stator is finished.

Because of how it is produced, the core has two ends, which must be placed flush against one another in the round bending of the core with the core winding. These two ends are placed geometrically in the bottom of a core slot.

In this prior art, it is disadvantageous that despite the good access to the slots, the fill factor is not optimal.

SUMMARY OF THE INVENTION

The invention is based on the recognition that the slots, widened before the lamination packet is bent round, must be filled in such a way that the inserted winding, even before the round bending, is at least approximately equivalent to the shape of the slots after the round bending, and a certain pressing action within the inserted winding is quite desirable.

The method according to the invention for producing a core for an electrical machine therefore provides that all the winding sides of the core winding, before they are inserted into the slots of the core, are pressed in a tool into a slot shape and reshaped. This is a highly advantageous provision, because with it, relatively high slot fill factors of 55% and more are attained. The preassembled structural unit comprising the flat core and the core winding, on being bent round, are prevented from having to absorb the deformation work on the round bending into the hollow-cylindrical shape, and thus the core is prevented from being deformed in an impermissible way.

In a further feature of the invention, it is provided that on each of both ends, to be joined together in a later step, of the core, one half-tooth each is formed in the circumferential direction; that is, the abutting edges of the lamination packet do not rest in a slot as is known, but rather inside a tooth framing the slots. Although this provision does make it harder to join the abutting edges, nevertheless if a coil with a winding overhang is inserted into the core, this winding overhang must be inserted into a slot shortly before the completion of the round bending of the core or stator. Once the slot has been fully formed, there is no risk that this winding side of the winding overhang will become clamped between the two ends at the abutting edges. Especially in a high-speed production process, this reliably and simply prevents the destruction of this final winding side to be put in place. Moreover, a slot insulation, placed around the final winding side to be inserted, is prevented from sliding down from the winding side as this winding side is put in place, and the production process is accordingly at least not hinder thereby. Another advantage of each half-tooth is that the magnetic resistance in the magnetic short circuit of the stator core is uninterrupted, and magnetic losses are thus reduced.

When the core winding is initially made, the individual sides of the coil or loop occupy an envelope space, which as a rule is larger than the actual slot space after the core has been bent round. If the winding sides, before being inserted into the core, are each pressed into a slot shape of a tool, which corresponds to a final shape of the slot of the core, then the winding sides are deformed, and the envelope space of the winding sides are adapted to the actual slot space after the stator or core has been bent round. This prevents the individual teeth of the core, in the round bending of the stator or core with the core winding, from exerting deformation forces and thus possibly becoming bent themselves, which might destroy the core. If at least a fraction of the thickness of an insulating layer is taken into account in the slot shape of the tool, which is done by reducing the size of the slot shape of the tool by such a fraction at the circumference of the slot shape, then at most the winding sides are pressed slightly between two teeth by the insulating layer. The winding sides or the core winding are thus kept in slightly damping fashion in their position; possible vibration of the winding sides is damped, and scouring off of a layer of paint from the coil wires and finally a possible short circuit are avoided. Especially taking into account the full thickness of the insulating layer, because the slot shape of the tool is smaller by the full thickness of the insulating layer than the slot shape of the core slots, the insulating layer remains unharmed.

If a core winding is wound with a so-called winding overhang, then a maximally symmetrical structure of both winding heads on both sides of the stator core is achieved. The winding heads, especially in the region of the abutting point, then do not have an approximately wedge-shaped recess that acts as a through opening and that could lead to a higher noise level when air flows through it. The symmetrical structure of the winding heads achieved by the winding overhang furthermore means that the bending resistance of the structural unit formed of the core and the core winding is maximally constant over the length or circumference of the stator. The finished component unit, bent into a cylindrical ring shape and comprising the core and the core winding, has especially good roundness as a result.

If the core winding has at least one overhanging winding side, and if the spacing between this at least one overhanging winding side and the next non-overhanging winding side is greater than the spacing between two adjacent slots, then the introduction of the overhanging winding side into the first slot is made easier before the completion of the round bending of the core; tensile strains between the overhanging winding side and the last winding side located in the last slot are prevented. If the at least one overhanging winding side, as the winding sides are being pressed into the slot shape, is lifted out of the plane defined by the non-overhanging winding sides, then in the round bending and finally insertion of the overhanging coils, the winding sides are prevented from colliding with the end of the core and possibly being damaged.

A core winding embodied as a two-layer loop winding has the advantage that each loop of a phase winding on the one hand has wires on the inside circumference and thus in the region of the tooth head, and on the other has wires in the region of the slot bottom. Since the cooling of the winding heads is as a rule better on the inside circumference than on the outside circumference, as a result a finally uniform cooling of a loop and thus of a complete phase winding is thus attained. Thus not only is one phase winding cooled uniformly, but also the entire core winding. Each individual phase winding can be designed for the same load.

If the core winding is embodied as a simple single-layer loop winding, then the core winding has no overhanging winding sides; in the round bending of the structural unit comprising the core and the core winding, no overhanging winding sides have to be fitted in, and the round bending process into the ring cylinder shape can be performed without overhanging winding sides, simply and without problems.

In a further feature of the invention, it is provided that the core made available, before the insertion of the core winding into the slots, is bent beforehand along its core spine, that is, along the unslotted side, by a certain amount, so that the slot openings are widened for insertion of the winding sides. As a result of this method step, it is possible, with very small slot openings of the still-flat core, to insert windings into the core that have winding sides that are wider than the slot opening. This makes relatively wide versions of the tooth heads possible and thus makes a very good transition of the magnetic field from a rotor to the core feasible, which considerably improves the efficiency. By this method step, it is also possible to use wires whose smallest dimension in cross section is greater than the width of the slot opening in the still-flat state of the stator core, as well as to use wires that have a non-round cross section.

If the winding overhang is inserted into the at least one slot before the completion of the bending of the core into the cylindrical ring shape and is only then bent to its final shape, then the slot opening is wider than in the fully bent core, which facilitates the insertion of the winding overhang.

In order that the core, bent into the cylindrical ring shape, will no longer deform back again by the elastic fraction of the bending, it is provided that the ends of the core be materially joined together.

DRAWINGS

The invention is described in further detail below in terms of exemplary embodiments in conjunction with the accompanying drawings. Shown are.

DESCRIPTION OF THE PREFERRED EMBODIMENTS

Figure 1:
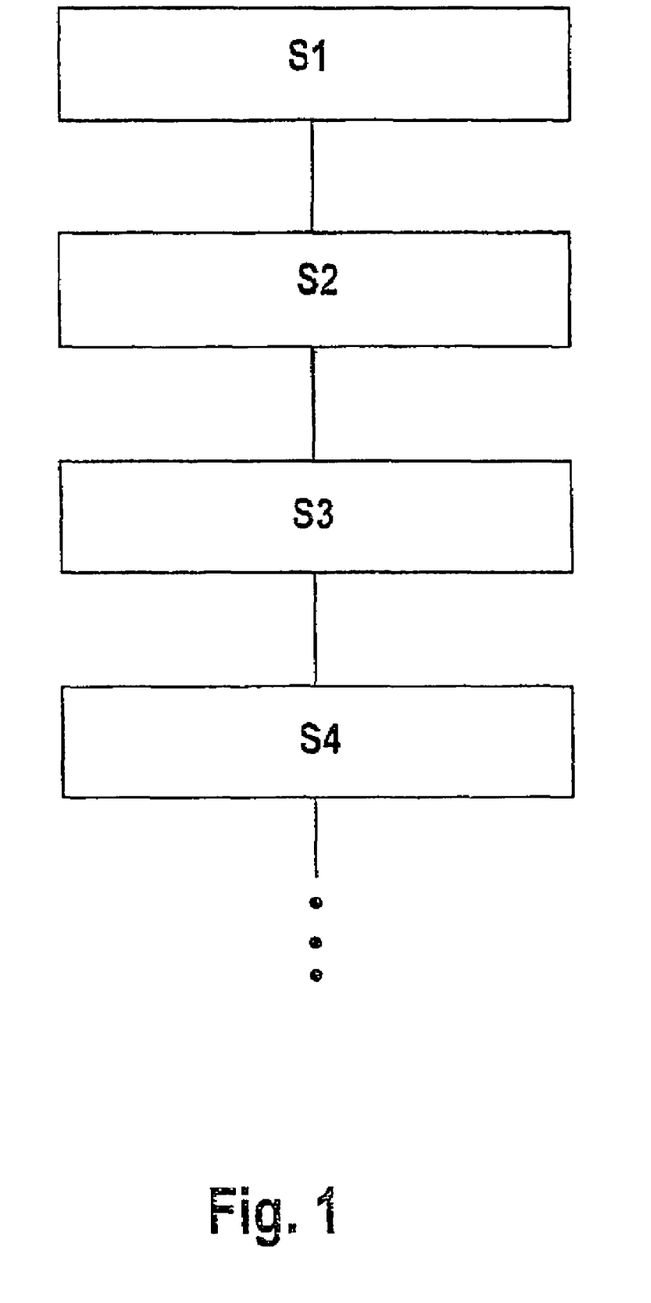
FIG. 1 shows the course of the method for producing the core of the invention with a core winding.

FIG. 1 is a schematic flow chart of the method of the invention, with the essential steps. In a method step S1, a magnetically excitable core 24 that has an essentially parallelepipiped shape 20 is made ready; see also FIG. 2. On one side 28, the core 24 has slots 32 extending parallel.

A core winding 40 has slot wire segments 105, which are later disposed in the slots 32. The slot wire segments 105, combined into a group and to be disposed in the slots 32, are called winding sides 36. The core winding 40 that has the winding sides 36 is pressed in a pressing tool 44 (FIG. 6B) in such a way that the winding sides 36 are reshaped and as a result adapted to the contour of a slot 32; this is method step S2. In a further, next method step S3, the pressed core winding 40 is inserted with its winding sides 36 into the slots 32 of the core 24; see also FIG. 8. In method step S4, the core 24 together with the core winding 40 is reshaped into a cylindrical ring shape 52, with radially inward-oriented slots 32.

Figure 2:
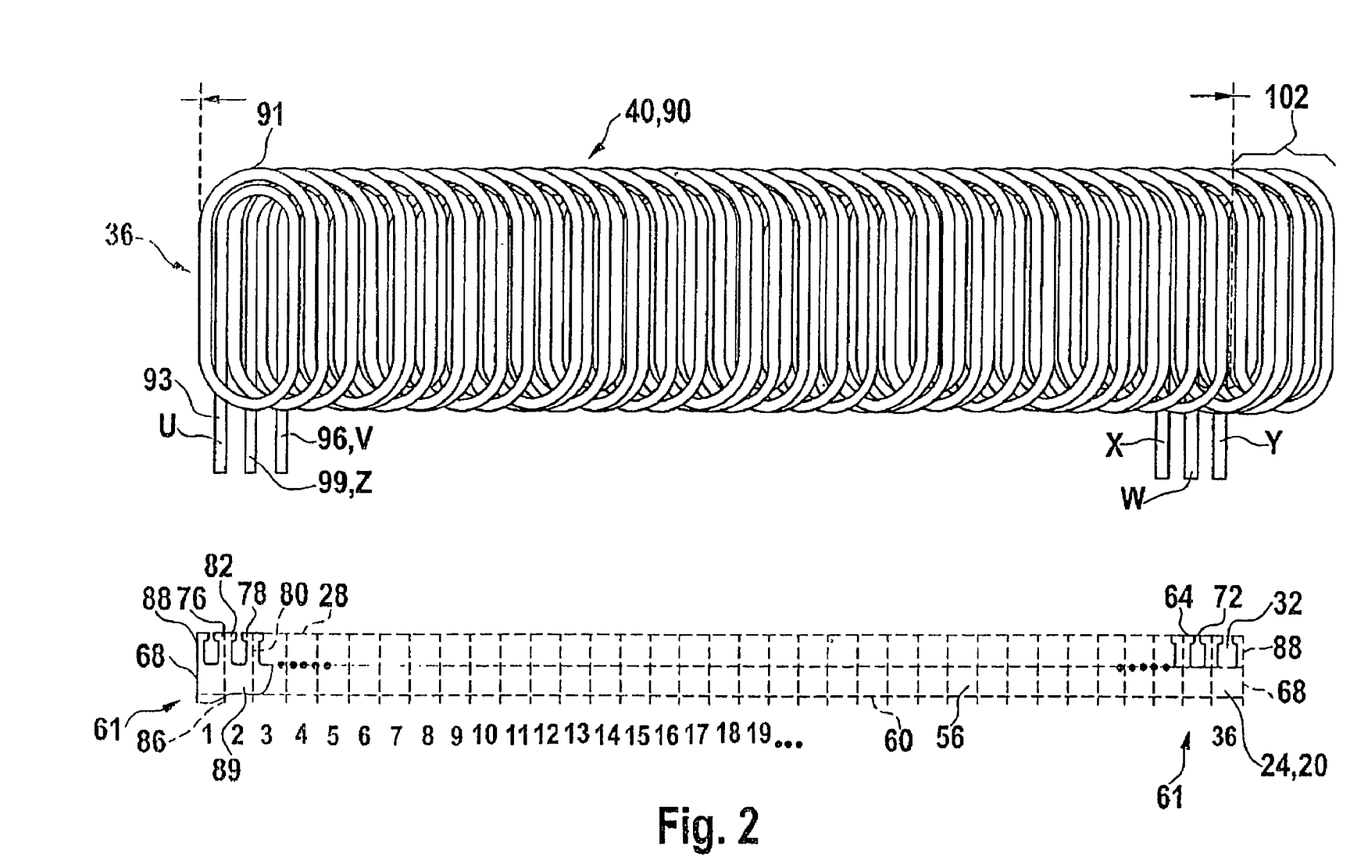
FIG. 2, a side view of a core of parallelepipiped shape and a plan view on a core winding having the core winding connections as well as their association with slots of the core.

FIG. 2 shows a side view of the parallelepiped core 24. The core 24 has a parellelpipiped shape 20 with end faces 56 facing away from one another. The and faces 56 are joined to one another by a spine face 60 and a slot face 64. The two end faces 56, the spine face 60 and the slot face 64 together define a rectangular core cross section; the core 24 has two ends 61, which each have one end face 68. The core 24 has a total of thirty-six slots 32, which are all oriented parallel to one another and disposed in the same plane. The slots 32 are all opened in the same direction and end in slot openings 72, which are located in the slot face 64. The slots 32 are defined by teeth 76 with parallel flanks. The teeth 76 have a tooth head 78, which ends in the slot face 64, and also have a tooth root 80. The roots 80 of the teeth 76 are all located in a plane that is parallel to the spine face 60. The teeth 76 have a cross-sectional or profiled form 82, so that the teeth 76 extend parallel to the end faces 68. Each tooth head 78 has two tooth strips 84—see also FIG. 8—which extend circumferentially once the core 24 has been bent into the cylindrical ring shape. Each tooth 76 is constructed symmetrically to a center tooth plane 86, which is oriented parallel to the end faces 68. On each of the two end faces 68 on the core 24, a tooth 88 is formed, which is divided in half in the central plane 86. Between the two half-teeth 88, thirty-five full teeth 76 are disposed, so that a total of thirty-six slots 32 and, once the core 24 has been bent into the round shape, thirty-six teeth 76 result, one tooth being formed of two teeth 88 divided in half.

The full teeth 76 and the half teeth 88 are joined integrally to one another by a core spine 89 at their root 80. The core spines form a magnetic short circuit of all the full and half teeth 76 and 88.

Above the core 24, the core winding 40 is shown, which is shown swiveled by 90° into the plane of the drawing compared to the core 24. The core winding 40 shown in FIG. 2 is a three-phase, two-layer loop winding 90. The three-phase loop winding 90, wound from coated or painted wire 91, comprises the first phase 93 having the terminal wires U and X, the second phase 96 having the core winding terminals V and Y, and the third phase 99 having the terminal wires W and Z. The loop winding 90 is inserted into a slot 32, having the slot number 1, by its core winding terminal U; the core winding terminal wire Z is inserted into a slot 32 having the slot number 2, and the core winding terminal wire V is inserted into a slot 32 having the slot number 3. While the core winding terminals U, Z and V as well as X, W and Y and all the winding sides 36 located in between are being inserted into the slots numbered 1-36, this core winding 40 has a so-called total winding overhang 102, which when the core winding 40 is inserted into the core 24 is initially not inserted into slots 32.

Figure 3:
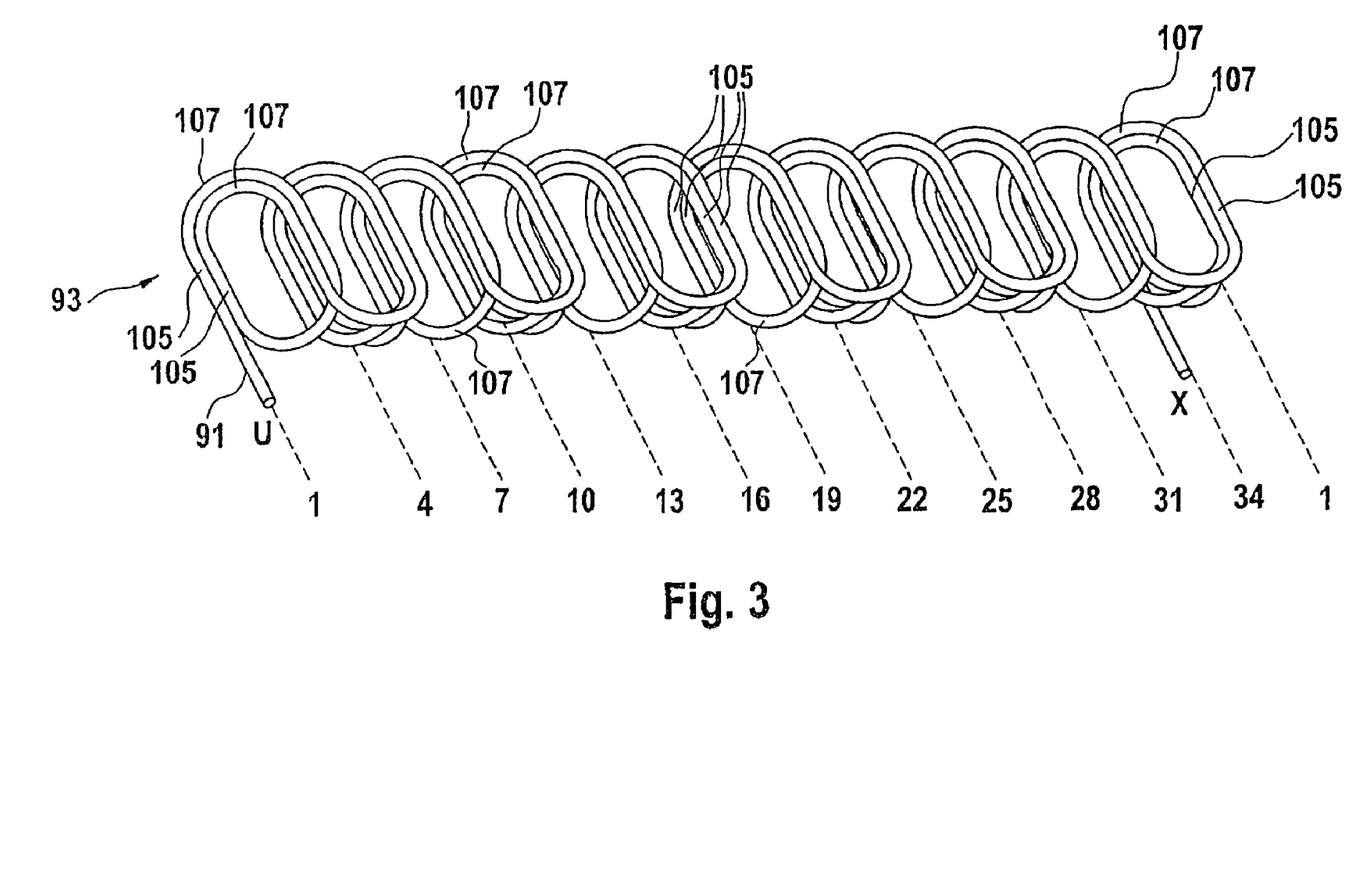
FIG. 3, a three-dimensional view of one phase of a two-layer loop winding.

In FIG. 3, the first phase 93 from FIG. 2 is shown in fundamentally the same embodiment. Like the other two phases, the first phase 93 comprises slot wire segments 105 as well as connecting wires 107 that connect these various slot wire segments 105. The numerals 1-34 shown below the view of the first phase 93 indicate which slot wire segments 105 come to rest in or are inserted into which slots having the slot numbers 1-34 and 1, respectively.

Figure 4:
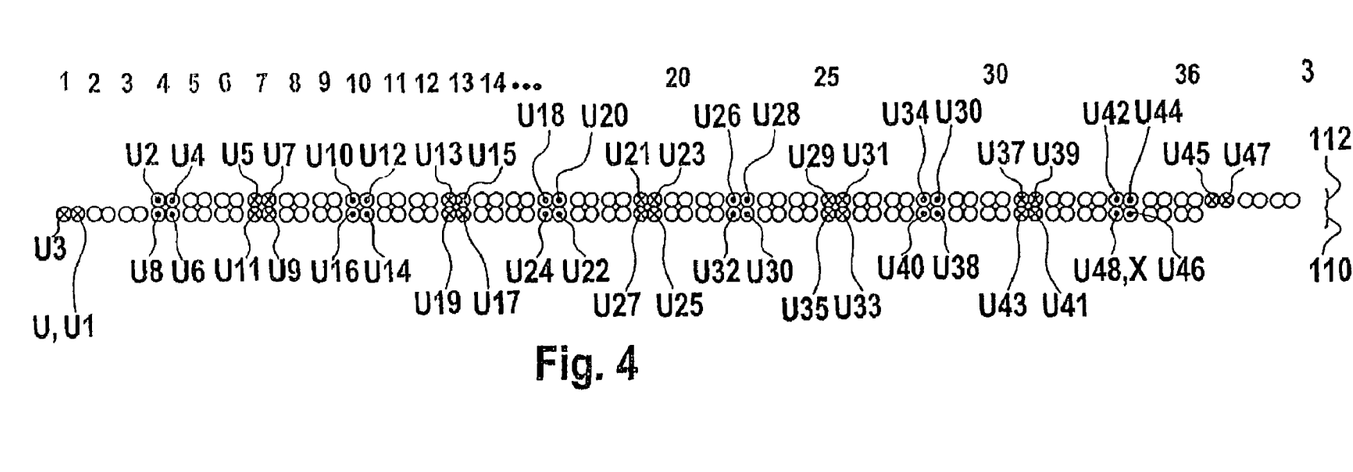
FIG. 4, a schematic of all three phases of the core winding, formed of a two-layer loop winding as in FIG. 3.

FIG. 4 shows a cross-sectional view of all three phases 93, 96 and 99, embodied as shown in FIG. 2, but only the first phase 93 is actually shown as an example. The other two phases 96 and 99 are fabricated analogously to it. The numerals 1-36 and 3 indicate the slot numbers. Beginning at slot 32 having the slot number 1, in a first step, beginning at the phase end U, one slot wire segment 105 is disposed in a position U1 corresponding to the slot 32 having the slot number 1. The connecting wire 107, not shown, adjoins the slot wire segment 105, U1 and extends as far as the position of the slot 32 having the slot number 4. The winding is extended onward with the slot wire segment 105, U2. The slot wire segment 105, U2 is adjoined by a further connecting wire 107, which with a slot wire segment 105, U3 is again wound onto the position of the slot 32 having the slot number 1. The winding diagram continues from there in alternation, as shown in FIG. 4, with a further connecting wire 107 to a position in the slot 32 having the slot number 4 via a slot wire segment 105, U4, and via connecting wires 107 and slot wire segments 105, U5 at the position of the slot 32 having the slot number 7, and so forth, as shown in increments, until finally at slot 32 having the slot number 42, it is extended to the outside again from the slot wire segment 105, U48 and finally represents the phase end X of the first phase 93. It becomes clear that past the slot 32 having the slot number 36, there are two slot wire segments 105, U45 and U47, which will later be placed in the slot 32 having the slot number 1 and thus above the slot wire segments 105, U3 and U1. In the illustration in FIG. 4, it becomes clear that the individual slot wire segments 105 come to rest in both a first layer 110 and a second layer 112. This is true for all three phases 93, 96 and 99. The first layer 110 will later come to rest in the interior of the slots 32, while the second layer 112 will later come to rest in the region of the slot openings 72. Although the illustration of the first phase 93 in FIG. 3 does deviate from the views in FIGS. 4 and 2, in terms of the location of the individual slot wire segments 105 in the individual layers, this has no influence on the production process or finally on the electrical effect.

Figure 5:
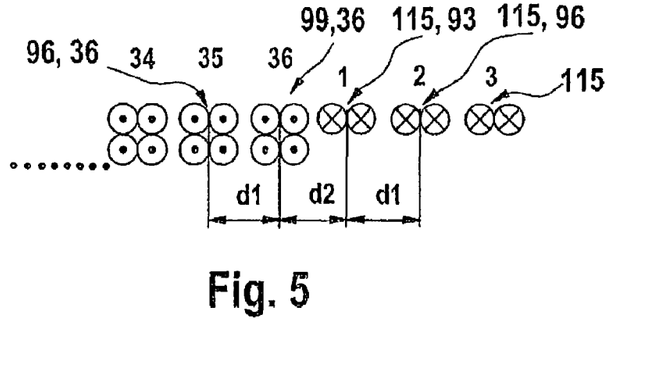
FIG. 5 shows details of a winding overhang of the winding of FIG. 4.

FIG. 5 in a detail and enlarged shows the region of the winding sides 36, which are inserted into the slots 32 having the slot numbers 34, 35, and 36, as well as the individual winding overhangs 115 of the three phases 93, 96 and 99. A spacing d1 between one winding side 36 of the second phase 96 and the winding side 36 of the third phase 99 is equivalent to the spacing between two slots 32 in the parallelepiped-shaped state of the core 24; see also FIG. 2. The spacing between the winding side 36 of the third phase 99 and the individual and first winding overhang 115 of the first phase 93 is marked d2. This spacing designates the spacing between the last winding side 36 to be inserted into the core 24 before it is bent round and the first winding overhang 115 that can no longer be inserted into the flat core 24. The spacing d2 is greater than the spacing d1. The spacing of the individual winding overhangs 115 of the three phases 93, 96 and 99 from one another is equivalent to the spacing d1.

Figures 6A, 6B, 6C, 6D, 7:
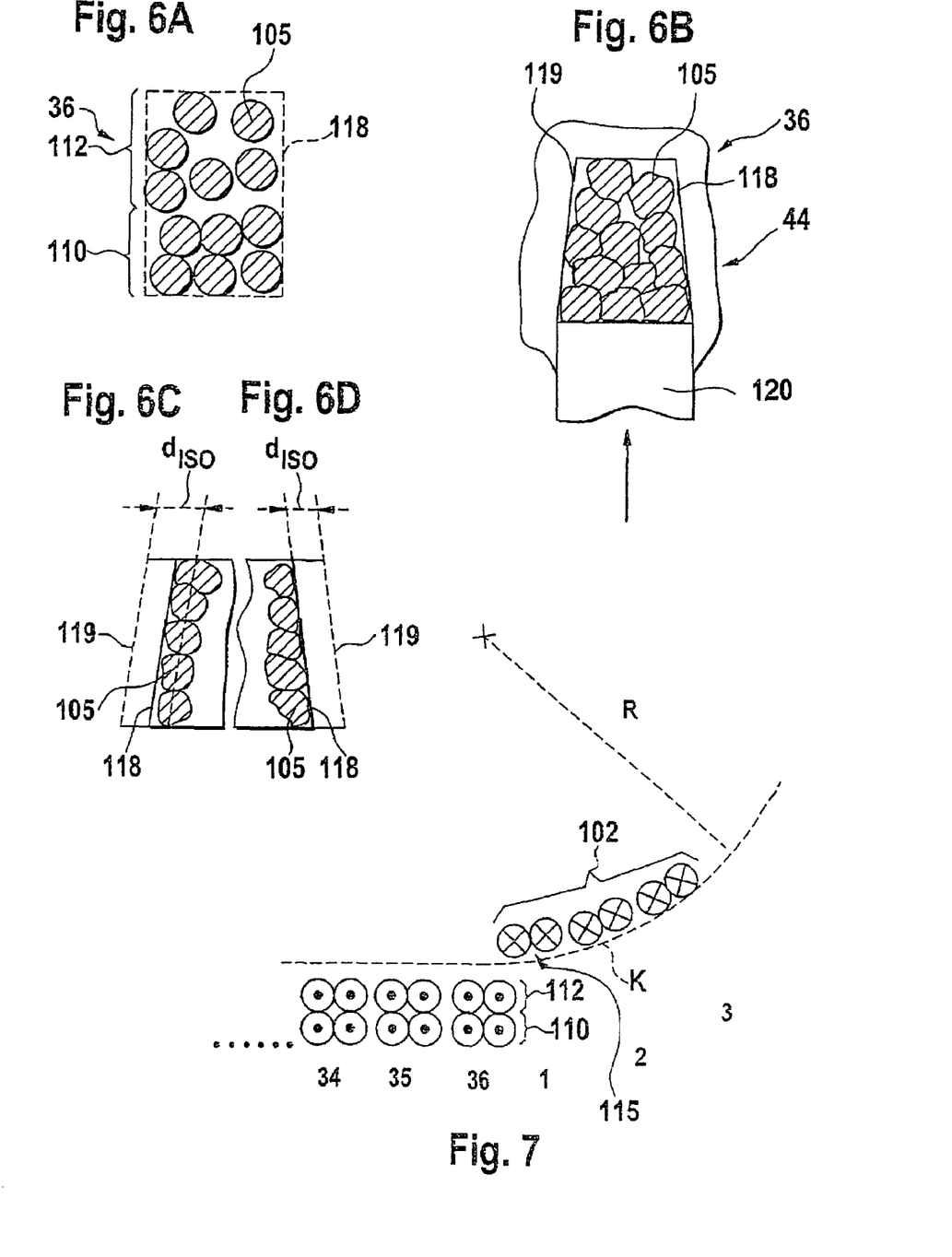
FIG. 6A shows a cross section of one winding side immediately after the winding process.
FIG. 6B, a winding side as in FIG. 6A in a pressing tool after a pressing operation.
FIGS. 6C and 6D, details of the contour of one loop side after the pressing.
FIG. 7, the winding overhang and its position relative to the next, non-overhanging winding sides.

In FIG. 6A, the cross section of a single winding side 36 is shown. The cross section of a single winding side 36 comprises first the cross sections of individual slot wire segments 105, which are initially disposed in more or less random order inside a certain envelope face 118. Compared to the view in FIGS. 3, 4 and 5, more loops or windings have been wound here. As has already been mentioned in conjunction with FIG. 1, before being inserted into the slots 32 of the core 24, the winding sides 36 are reshaped in a pressing tool in such a way that the envelope face 118 finally assumes the slot shape 119 of the pressing tool 44; see also FIG. 6B. To that end, the winding side 36 is first inserted loosely into the slot shape 119 of the pressing tool 44 in the direction indicated by the arrow in FIG. 6B. Next, a die 120 presses the winding side 36 into the slot shape 119 and in the process reshapes the winding side 36 plastically in such a way that it permanently, as the outermost envelope face 118, assumes the slot shape 119. The slot shape 119 of the pressing tool 44 can be embodied such that it corresponds to the cross-sectional shape of the slots 32 after the bending. In a variant, it is provided that the slot shape 119 is equivalent to the cross-sectional shape of the slots 32, minus at least a fraction of the material thickness $d_{ISO}$ of an insulating layer 23; see also FIGS. 6C and 6D as well as FIG. 8.

If the core winding 40, as shown in FIG. 4, is wound with a total winding overhang 102, then the total winding overhang 102 is located at the level of the second layer 112. Pressing the core winding 40 in the pressing tool 44 is intended at the same time to lift the total winding overhang 102 out of the plane defined by the second layer 112. The individual winding overhangs 115 have undersides, which are later oriented toward the first layer 110. These undersides of the individual winding overhangs 115 are lifted above the second layer 112 by the pressing in the pressing tool 44 and are located on a curve K, which is located inside the later diameter of the later round core 24.

Figure 8:
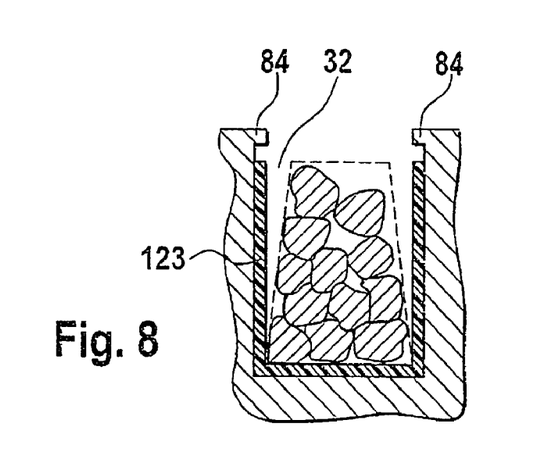
FIG. 8, a cross section of a slot with a winding side inserted, before the round bending.

After the pressing and reshaping of the winding sides 36 of the core winding 40, the core winding 40 with the winding sides 36 is inserted into the slots 32, which are lined with insulating material 123; see FIG. 8.

The preassembled structural unit, formed of the core 24, the insulating material 123 and the core winding 44, is reshaped in the next method step S4 into a cylindrical ring shape 52 with radially inward-oriented slots 32. This begins with the half-tooth 88 that is adjacent to the slot 32 having the slot number 36. The half-tooth 88 is bent in a tool relative to the next tooth 76 between the slots 32 having the slot numbers 35 and 36, so that the tooth heads 78 move closer together and the slot openings 72 are reduced in size. Simultaneously, a spine portion 140 between the half-tooth 88 and the tooth 76, between the slots 32 having the slot numbers 35 and 36, is bent in such a way that the angle between the tooth 76 and the spine portion 140 is made smaller; the same applies to the half-tooth 88. This reshaping operation is continued until such time as finally the tooth 76, between the slots 32 having the slot numbers 3 and 4, is bent toward the tooth 76 between the slots 32 having the slot numbers 2 and 3.

Before the round bending of the core 24 is concluded, however, first the three winding overhangs 115 of the three phases 93, 96 and 99 must be inserted into the slots 32 having the slot numbers 3, 2 and 1. To that end, the individual winding overhangs 115 are inserted or thrust into the slots 32 having the slot numbers 3, 2 and 1, each by means of a respective die 126. In a variant, this can also be done for all the winding overhangs 115 by means of a single die 127; see also FIG. 10.

Figure 11:
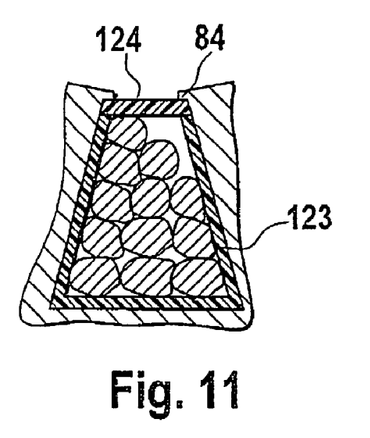
FIG. 11, a cross-sectional view of a slot after the round bending.
Figure 12:
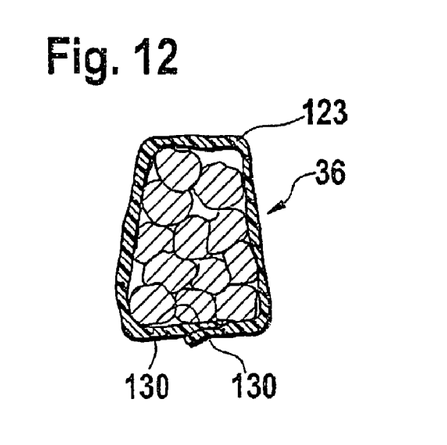
FIG. 12, a further exemplary embodiment for insulating one winding side.
Figure 13:
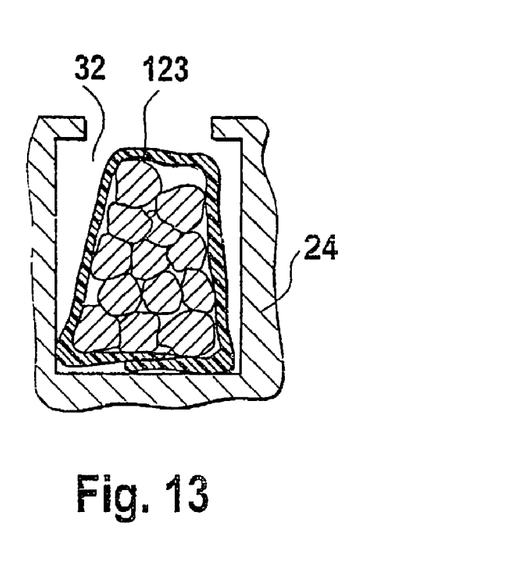
FIG. 13, a detail of a winding side, insulated in accordance with FIG. 12, in a slot.

Instead of lining a slot 32 with an insulating layer 123 before pressed winding side 36 is inserted and the slot is subsequently closed by means of a slot closing foil 124—see also FIG. 11—it is also possible in a variant to equip the dies 126 and 127 with slot closing foils 124, so that the slot closing foils 124 can be thrust into the slots 32 simultaneously with the winding overhangs 115. The position of these foils in the slots 32 is then equally assured by the slot openings 72, which are narrowed in the round bending of the core 24, under the tooth strips 84. Yet another variant provides again using a two-part slot isolation, comprising an insulating layer 123 and a slot closing foil 124. Here the already-pressed core winding 40, or its winding side 36, before being inserted into the core 24 is folded over and optionally glued to the sides having the insulating layer 123, which later is located in the slot bottom. The slot closing foil 124 is inserted into the slots 32 as before, with the winding overhangs 115, by way of the dies 126 and 127 that are equipped with slot closing foils 124. Another variant provides that the pressed winding sides 36, before insertion into a slot 32, are folded over with a one-piece insulating layer 123; see FIG. 12. In the exemplary embodiment shown there, the insulating layer 123 is folded around the winding side 36 in such a way that two ends 130 of the insulating layer 123 overlap and are glued together between the two faces, adjoining one another, of the ends. In this variant, the entire core winding 40 is not inserted into the slots 32 of the core 24 until after the winding sides 36 have been folded over onto the insulating layer 123; see FIG. 13.

Figure 14:
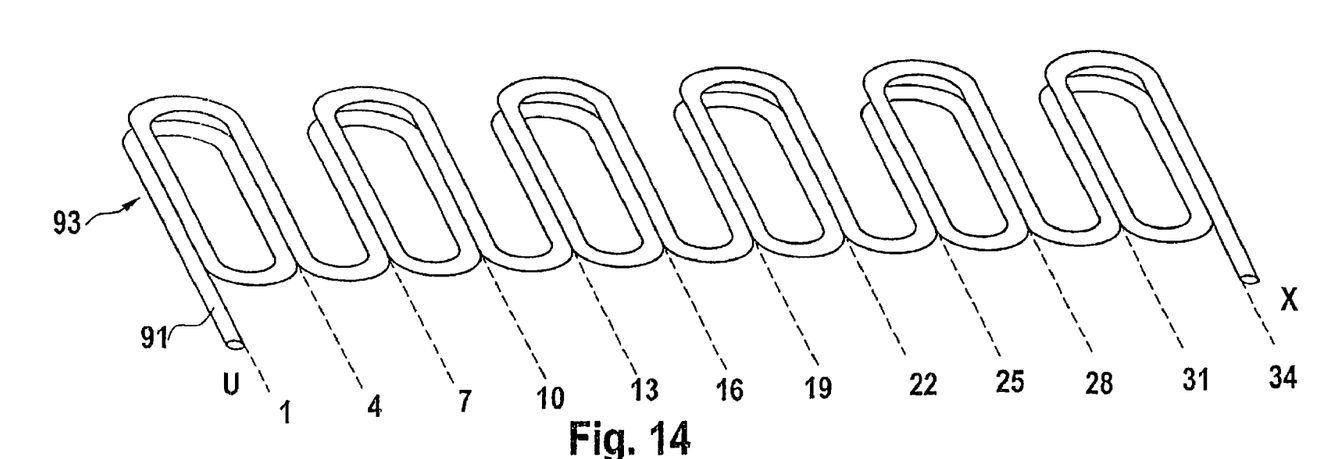
FIG. 14, a three-dimensional view of a single phase of a single one-layer loop winding.
Figure 15:
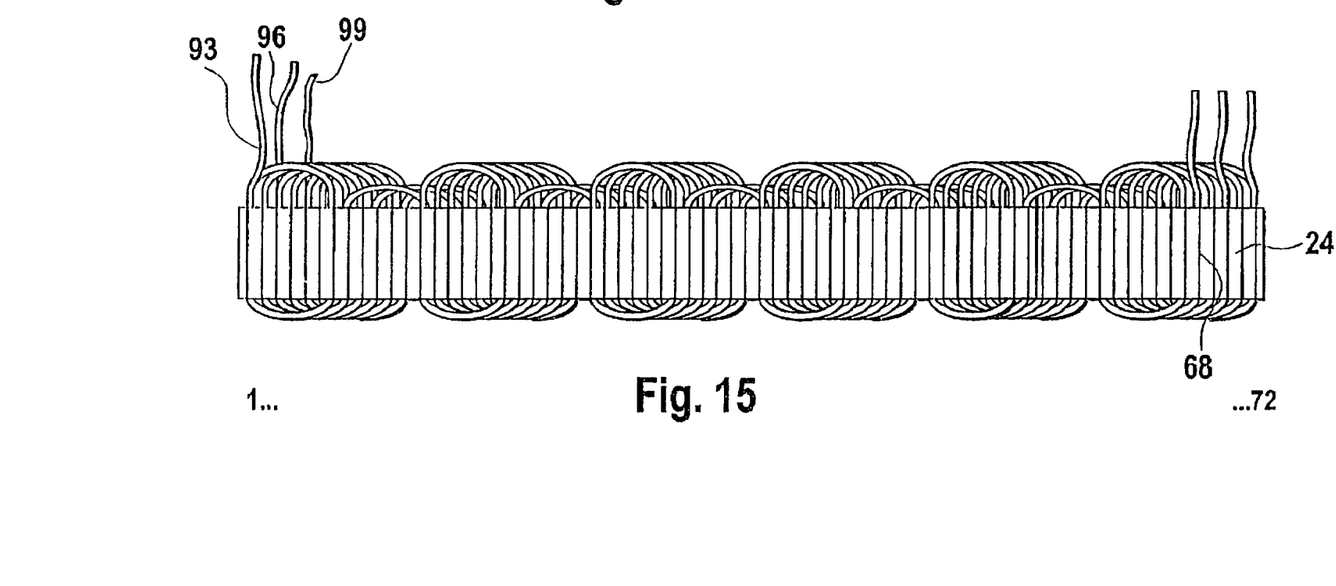
FIG. 15, a core winding in a parallelepiped core, formed of a three-phase single-layer simple loop winding.

FIG. 14 shows a simple loop winding in a three-dimensional view. This loop winding in turns represents the first phase 93 of a core winding 40. As in the case of the two-layer loop winding of FIGS. 3 and 4, winding begins at a position of a slot 32 having the slot number 1, so that a first loop is wound into the slots 32 having the slot numbers 1 and 4, and finally in a triple step with regard to the slot spacings, further coils are disposed. The first phase 93, finally, ends with the end X in the slot 32 having the slot number 34. A correspondingly constructed second phase 96, for forming a core winding 40, is placed above the first phase 93, beginning at a slot 32 having the slot number 2 and extending to a slot 32 having the slot number 35. The same is done with a third phase 99, beginning in the slot numbered up to the slot having the slot number 36. A core winding 40 constructed in this way has no total winding overhang 102. FIG. 15 shows a core 24 with seventy-two slots. Here a first phase 93, beginning at a slot 32 having the slot number 1, is wound into the slots 1 and 7, and then after a certain number of windings is wound around the slots 2 and 8. With a coil connecting wire, finally, after the second coil has been wound into the slots 13 and 19, a further coil is respectively wound into the slots 14 and 20, and so forth, until finally after a total of eight further coils, the phase winding 93 in the slot having the number 68 the wire is again extended out of the core 24. Beginning at slot 32 having the slot number 3, the second phase 96 begins, so that finally in the slot having the number 70, the wire of the second phase 96 is carried out of the core 24 again. The winding of the third phase 99 begins at the slot having the number 5 and ends in the slot having the number 72.

Figure 16:
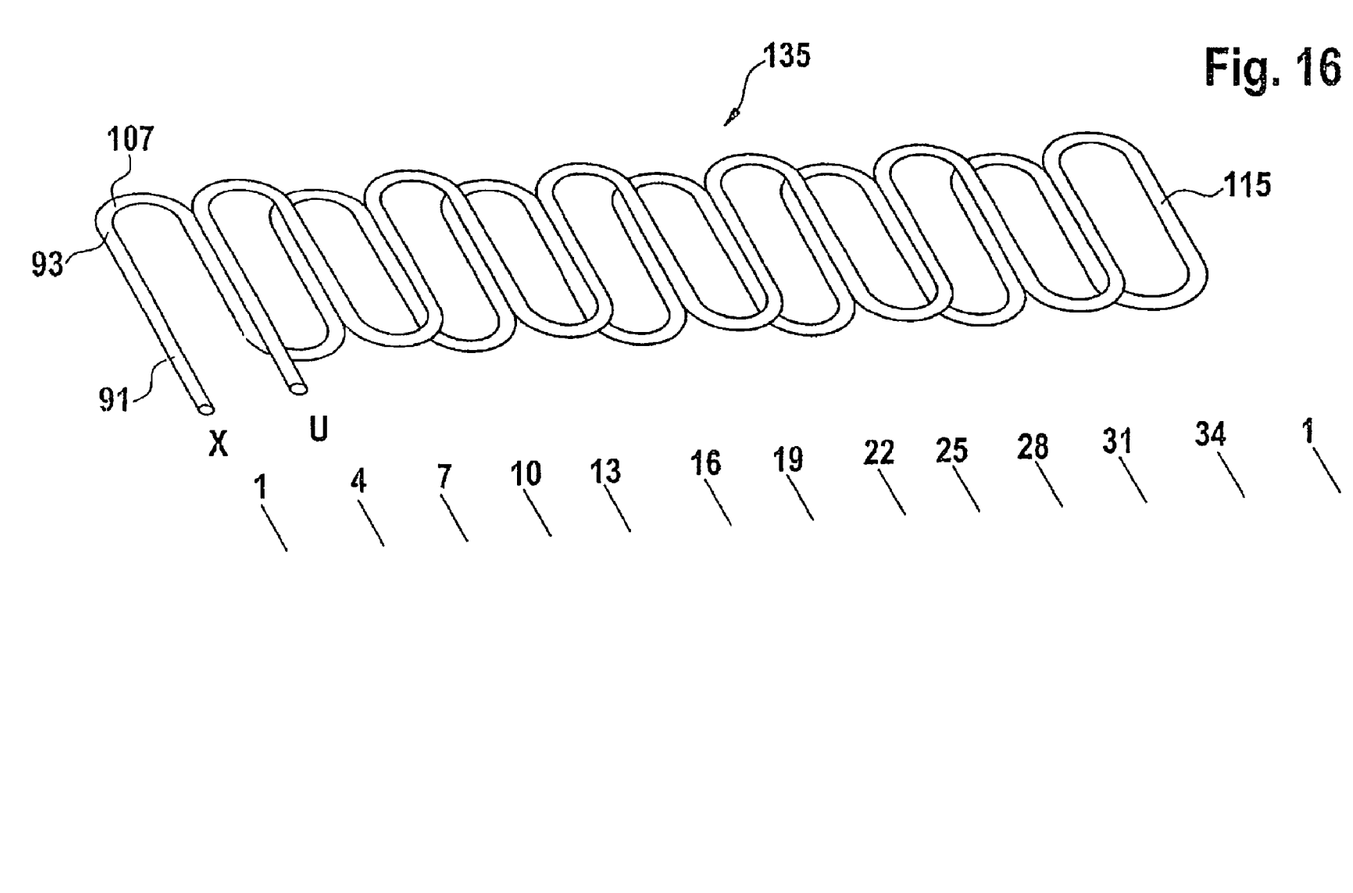
FIG. 16, a simple exemplary embodiment of a distributed wave winding.

In FIG. 16, the first phase 93 is shown, in the form of a distributed wave winding 135. Beginning at the slot 32 having the slot number 1, above a connecting wire segment 107, the wire 91 is extended into the slot 4, and from there again above a further connecting wire segment 107 into the slot 7, and as FIG. 16 shows, it is wound further until a first winding overhang 116 is created in a position corresponding to the slot 1. From there, winding is done backward above the slots 34 through 4. A second phase winding 96 is wound analogously, from slot 2 back to slot 2, and a winding overhang 115 formed there is wound back again to slot 5; a third phase, beginning in slot 3, is wound up to a winding overhang 115 in the slot 32 having the slot number 3 and from there back again to the slot 32 having the slot number 6. A core 24 with this kind of core winding 40 embodied as a distributed wave winding 35 is equally well suited to the method of the invention.

In a further exemplary embodiment, first the core 24 is made ready. The winding 40 is either wound into the slots 32 with the wire 91, or a prefabricated winding 40 is inserted into the slots 32. The winding 40 is not yet pressed here. Next, in alignment with slot sides 170 of a slot 32, a respective guide element 173 is mounted onto the side 28 of the core 24 that later will be oriented radially inward, so that a constant spacing is set between the guide elements 173. A shaping die 176 with an inner contour 179 is then moved to the winding side 115, guided by the two guide elements 173. The individual slot wire segments 105 of the winding side 115 are forced into the inner contour 179 in the process and reshaped in such a way that the cross sections of the winding sides 115, after the reshaping, correspond to the cross section of a slot 32 after the core 24 has been bent round; see FIGS. 17A and 17B.

Figure 17A:
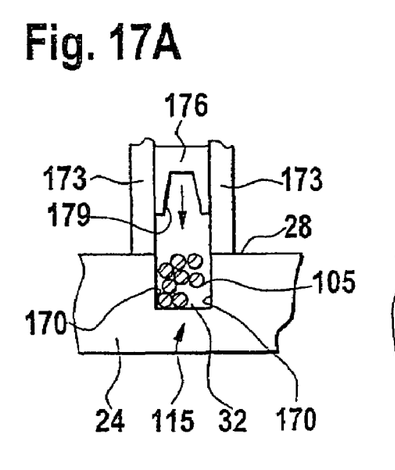
FIGS. 17A, 17B and 17C, a further exemplary embodiment of a production method.
Figure 17B:
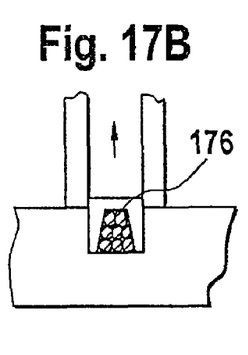

Alternatively, it is also possible for individual slot wire segments 105, each wound into one slot 32, to be pressed successively.

Before the winding 40 is wound into place or inserted, an insulating layer 123 can be provided, as needed.

Figure 17C:
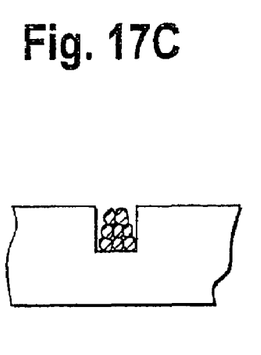

After the reshaping, the shaping die 176 is withdrawn from the slot 32 again, and the guide elements 173 are lifted from the core 24; see FIG. 17C.

Figure 9:
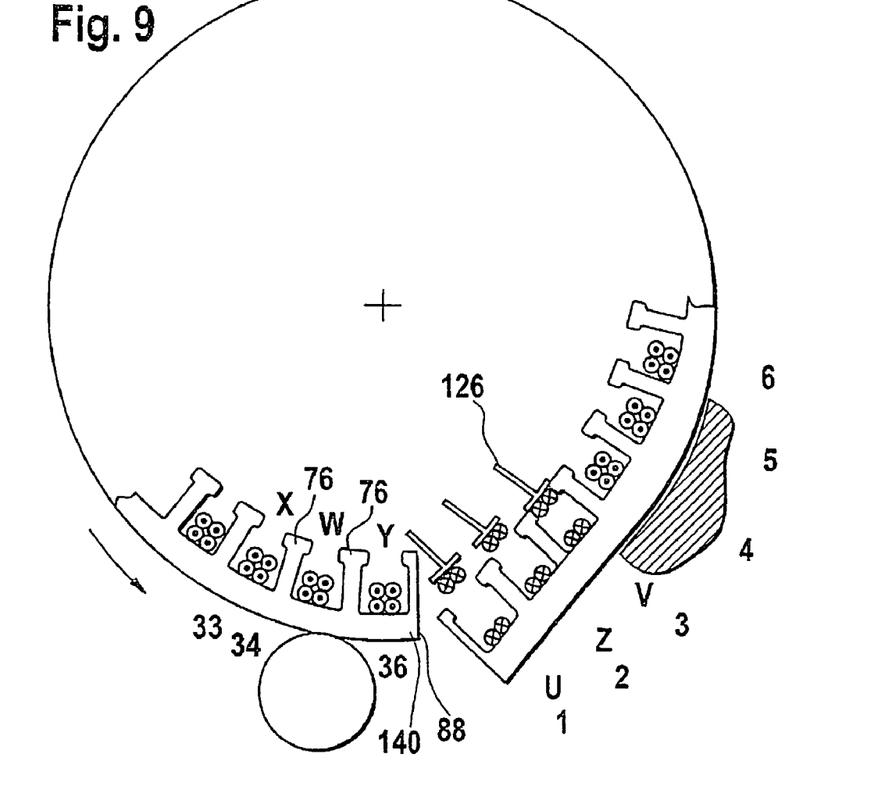
FIG. 9, a detail of a side view of the core, almost completely bent round, with an auxiliary device for pressing the overhanging coils into the slots 1-3.
Figure 10:
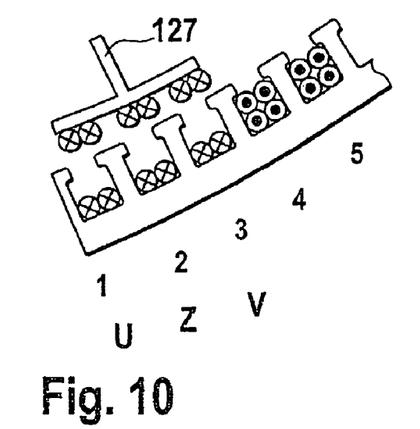
FIG. 10, a variant of the device of FIG. 9 for pressing the overhanging coils into the slots 1-3.

This core 24 with the winding 40 is then machined as shown in FIG. 9 or 10 and described in conjunction with it, in the further method steps.

In a further exemplary embodiment, it is provided that wire 91 is used whose greatest cross-sectional dimension is larger than the width of the slot opening 72 in the circumferential direction of the core 24, when the core is still in the parallelepipiped shape 20. If such a winding, with an endless wire 91, for instance a wire 91 of rectangular wire cross section of the kind used for windings known as rod windings, is wound in the way already described for three versions of windings, then intrinsically it is not possible to insert the core winding 40. To overcome this problem, the core 24, before the insertion of the core winding 40, is bent along its spine face 60 in such a way that the slot openings 72 become wider and the core winding 40 is insertable. Once the core winding 40 has been inserted, then as already described, once again the core 24 with the core winding 40 is subsequently bent round, and the slot openings 72 are narrowed further; see FIG. 18B.

Compared with typical rod windings, which often have twice as many welded or soldered switch connections as they have slots 32, the expense of producing switch connections is limited to the wire ends from U to Z.

Figure 18A:
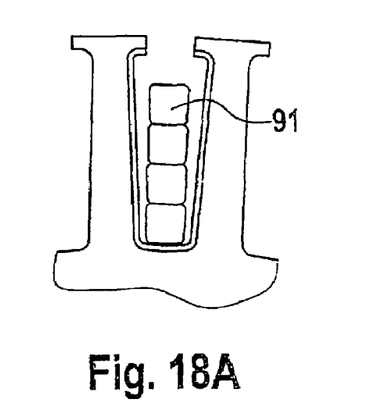
FIG. 18A, a detail of a core with a bent-open slot and an introduced winding side.
Figure 18B:
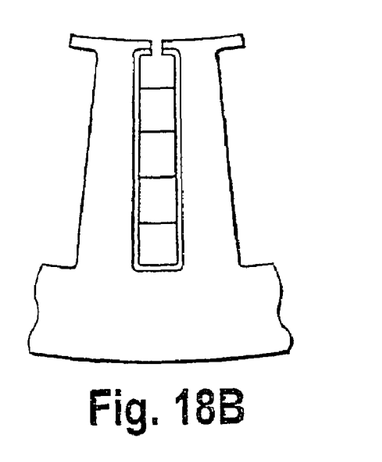
FIG. 18B, a detail of the slot of FIG. 17A after the round bending of the core.

The exemplary embodiment of FIGS. 18A and 18B is not limited to the use of wires having the cross-sectional dimensions given. On the contrary, it is equally applicable to core windings 40 having winding sides 36 that are pressed in such a way that because of their width in the circumferential direction they can intrinsically not be inserted into the slot opening 72 but instead can be inserted only after the slot opening has been widened, after the core 24 is bent along its spine face 60.

To improve a dimensional stability of the pressed winding sides 36, a so-called baked enamel can be used to fix the winding sides 36. This can be done for instance by using a wire 91 already treated with such a coating, whose coating layer is heated in the pressing tool 44 and it assumes at least a sticky, viscous state, so that the wires 91 can stick together and are solidly joined to one another after they cool down and set and are then easy to process further.

The electrically effective slot fill factor is defined here as the ratio between the cross section of the areas of the sum of cross sections of the electrically effective part of the slot wire segments 105 disposed in one slot 32, compared to the cross section of the slot 32 after the round bending. Within the scope of the invention, it is provided that an electrically effective slot fill factor of at least 55% can be achieved. This lower limit is a minimum requirement for electrical effectiveness. An upper limit of 75% is technically just barely feasible. A higher slot fill factor leads to such strong forces upon pressing of the winding sides 36 that a coating layer on the wires 91 is damaged, so that short circuits in the core winding 40 render the core winding useless. A good compromise, considering production variations and technical feasibility, exists for a slot fill factor in a range between 57% and 70%.

Figure 19A:
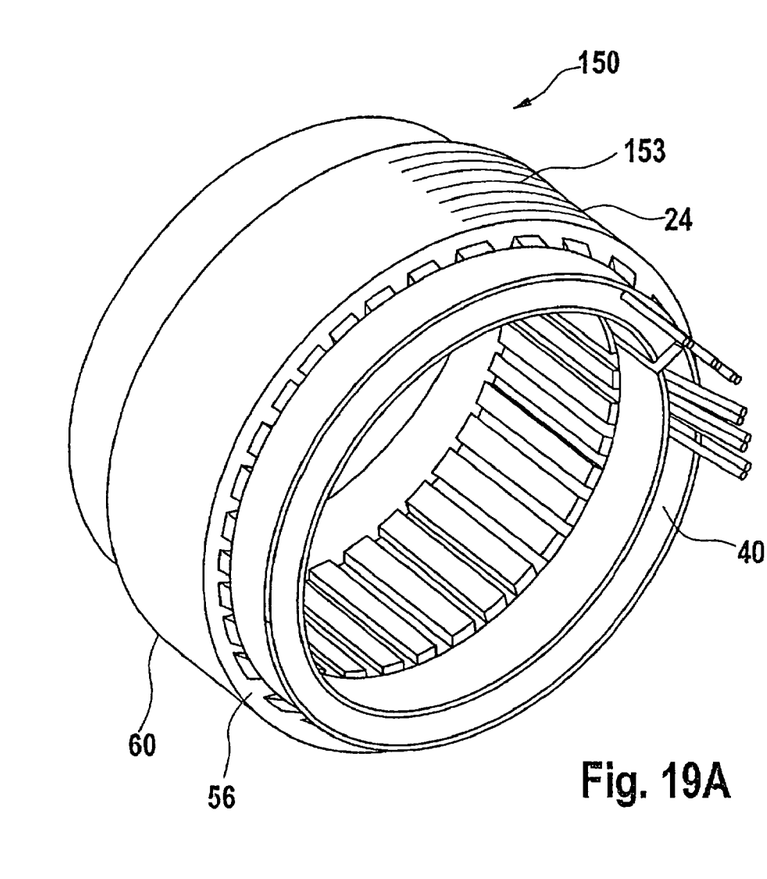
FIG. 19A, a core with a core winding after the end of its production.
Figure 19B:
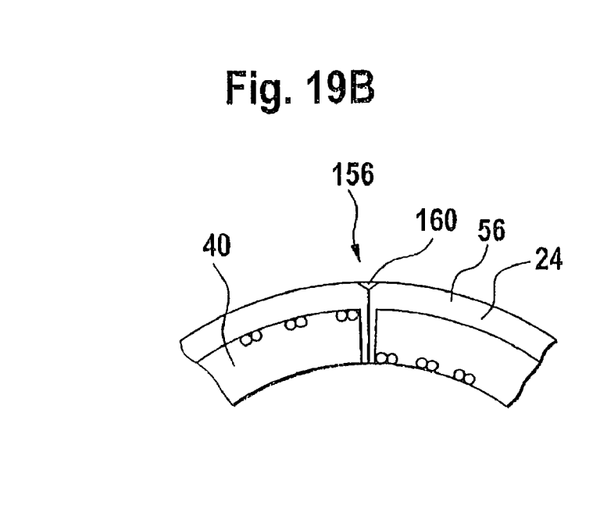
FIG. 19B, a detail of the core with the core winding in the region of the joining point.

In FIG. 19A, a stator 150 is shown, comprising a core 24 constructed of laminations 153, with a simple loop winding as the core winding 40. In FIG. 18B, a joining point 156 is shown, formed of the two end faces 68, placed against one another, of the core 24 that has bent round. In order not to allow the now round core 28 to gape open about the elastic portion of the bend, a weld seam 160 is placed at the joining point 156, in order to join both ends 61 of the core 24 solidly to one another.

Figure 20:
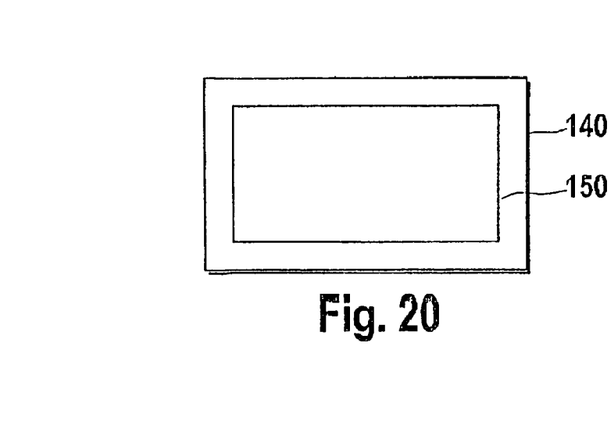
FIG. 20, an electrical machine having a core with a core winding according to the invention.

In FIG. 20, a symbolic illustration is provided of an electrical machine 140 with a stator 150 according to the invention.

The invention claimed is:

1. A method for producing a magnetically excitable core (24) having a core winding (40) for an electrical machine, by which in a method step (S1), the core (24), having a substantially parallelepiped shape (20) with slots (32) extending parallel on one side, is furnished, into whose slots (32), in a method step (S2), the core winding (40) is inserted by winding sides (36), and then in a method step (S3), the core (24) together with the core winding (40) is reshaped into a cylindrical ring shape with radially inward-oriented slots (32), wherein in each case all the winding sides (36) that are inserted into each slot (32) are pressed into a slot shape (119) in a tool (44) and reshaped before being inserted into the slot (32), characterized in that the winding sides (36) of the core winding (40) are pressed into the slot shape (119), which corresponds to a cross-sectional shape of the slots (32) of the core (24), minus at least a fraction of a thickness ($d_{ISO}$) of an insulating layer (123).

2. The method of claim 1, characterized in that each slot (32) has a slot opening (72), the slot opening (72) has a width in a circumferential direction of the core (24) when the core (24) has still the substantially parallelepiped shape (20), and the core winding (40) is wound of a wire (91) having a greatest cross-sectional dimension that is larger than the width of the shot opening (72) in the circumferential direction of the core (24).

3. A method for producing a magnetically excitable core (24) having a core winding (40) for an electrical machine, by which in a method step (S1), the core (24), having a substantially parallelepiped shape (20) with slots (32) extending parallel on one side, is furnished, into whose slots (32), in a method step (S2), the core winding (40) is inserted by winding sides (36), and then in a method step (S3), the core (24) together with the core winding (40) is reshaped into a cylindrical ring shape with radially inward-oriented slots (32), wherein in each case all the winding sides (36) that are inserted into each slot (32) are pressed into a slot shape (119) in a tool (44) and reshaped before being inserted into the slot (32), characterized in that the core winding (40) is wound with at least one winding overhang (115).

4. The method of claim 3, characterized in that a spacing (d2) of one winding side from an adjacent, winding side is wound larger than a spacing (d1) between two slots (32).

5. The method of claim 4, characterized in that by the pressing of the winding sides (36) into the slot shape (119), the at least one overhanging winding side is permanently lifted out of a plane formed by the non-overhanging winding sides.

6. The method of claim 3, characterized in that each slot (32) has a slot opening (72), the slot opening (72) has a width in a circumferential direction of the core (24) when the core (24) has still the substantially parallelepiped shape (20), and the core winding (40) is wound of a wire (91) having a greatest cross-sectional dimension that is larger than the width of the shot opening (72) in the circumferential direction of the core (24).

7. A method for producing a magnetically excitable core (24) having a core winding (40) for an electrical machine, by which in a method step (S1), the core (24), having a substantially parallelepiped shape (20) with slots (32) extending parallel on one side, is furnished, into whose slots (32), in a method step (S2), the core winding (40) is inserted by winding sides (36), and then in a method step (S3), the core (24) together with the core winding (40) is reshaped into a cylindrical ring shape with radially inward-oriented slots (32), wherein in each case all the winding sides (36) that are inserted into each slot (32) are pressed into a slot shape (119) in a tool (44) and reshaped before being inserted into the slot (32), characterized in that the core winding (40) is embodied as a two-layer loop winding.

8. The method of claim 7, characterized in that each slot (32) has a slot opening (72), the slot opening (72) has a width in a circumferential direction of the core (24) when the core (24) has still the substantially parallelepiped shape (20), and the core winding (40) is wound of a wire (91) having a greatest cross-sectional dimension that is larger than the width of the shot opening (72) in the circumferential direction of the core (24).

9. A method for producing a magnetically excitable core (24) having a core winding (40) for an electrical machine, by which in a method step (S1), the core (24), having a substantially parallelepipiped shape (20) with slots (32) extending parallel on one side, is furnished, into whose slots (32), in a method step (S2), the core winding (40) is inserted by winding sides (36), and then in a method step (S3), the core (24) together with the core winding (40) is reshaped into a cylindrical ring shape with radially inward-oriented slots (32), wherein in each case all the winding sides (36) that are inserted into each slot (32) are pressed into a slot shape (119) in a tool (44) and reshaped before being inserted into the slot (32), characterized in that the core (24), before the core winding (40) is inserted into the slots (32), is bent over a core spine (89) in such a way that slot openings (72) for insertion of the winding sides (36) are widened.

10. The method of claim 9, characterized in that each slot (32) has a slot opening (72), the slot opening (72) has a width in a circumferential direction of the core (24) when the core (24) has still the substantially parallelepipiped shape (20), and the core winding (40) is wound of a wire (91) having a greatest cross-sectional dimension that is larger than the width of the shot opening (72) in the circumferential direction of the core (24).

11. A method for producing a magnetically excitable core (24) having a core winding (40) for an electrical machine, by which in a method step (S1), the core (24), having a substantially parallelepipiped shape (20) with slots (32) extending parallel on one side, is furnished, into whose slots (32), in a method step (S2), the core winding (40) is inserted by winding sides (36), and then in a method step (S3), the core (24) together with the core winding (40) is reshaped into a cylindrical ring shape with radially inward-oriented slots (32), wherein in each case all the winding sides (36) that are inserted into each slot (32) are pressed into a slot shape (119) in a tool (44) and reshaped before being inserted into the slot (32), characterized in that the winding overhang (115) is inserted into the at least one slot (32) before a conclusion of a bending of the core (24) into the cylindrical ring shape (52).

12. The method of claim 11, characterized in that each slot (32) has a slot opening (72), the slot opening (72) has a width in a circumferential direction of the core (24) when the core (24) has still the substantially parallelepipiped shape (20), and the core winding (40) is wound of a wire (91) having a greatest cross-sectional dimension that is larger than the width of the shot opening (72) in the circumferential direction of the core (24).

* * * * *